United States Patent
Elfstrom et al.

(10) Patent No.: US 9,903,955 B2
(45) Date of Patent: Feb. 27, 2018

(54) TIME TO FIRST FIX, TTFF, SENSITIVITY AND ACCURACY FOR A GLOBAL NAVIGATION SATELLITE SYSTEM POSITIONING DEVICE

(75) Inventors: Torbjorn Elfstrom, Fjaras (SE); Lars Persson, Asa (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 714 days.

(21) Appl. No.: 14/357,868

(22) PCT Filed: Nov. 14, 2011

(86) PCT No.: PCT/EP2011/070042
§ 371 (c)(1),
(2), (4) Date: May 13, 2014

(87) PCT Pub. No.: WO2013/071944
PCT Pub. Date: May 23, 2013

(65) Prior Publication Data
US 2014/0313078 A1    Oct. 23, 2014

(51) Int. Cl.
 G01S 19/24    (2010.01)
 G01S 19/26    (2010.01)
 G01S 19/31    (2010.01)
 G01S 19/34    (2010.01)
 G01S 19/25    (2010.01)

(52) U.S. Cl.
 CPC .............. *G01S 19/24* (2013.01); *G01S 19/34* (2013.01); *G01S 19/25* (2013.01)

(58) Field of Classification Search
 USPC ............ 342/357.63, 357.65, 357.71, 357.74; 701/468, 490
 See application file for complete search history.

(56) References Cited

U.S. PATENT DOCUMENTS

2008/0266174 A1    10/2008    Medina Herrero
2009/0098880 A1    4/2009    Lindquist

*Primary Examiner* — Dao Phan
(74) *Attorney, Agent, or Firm* — Rothwell, Figg, Ernst & Manbeck, P.C.

(57) ABSTRACT

The present invention relates to a method for improving Time To First Fix, TTFF, sensitivity and accuracy, wherein a Global Navigation Satellite System, GNSS, positioning device (15), communicates with a Core Service (11) in a User Equipment (16), U—the GNSS positioning device acquires (23) GNSS satellite signals and navigation data and based on said signals/data determines a position within TTFF,—the Core Service detects (24) user data indicating specific user behaviors and initiates said determination of position based on said user data. The present invention also relates to a Core Service, a Global Navigation Satellite System, GNSS, positioning device, a Radio Module and a User Equipment, UE, adapted for the same purpose.

10 Claims, 3 Drawing Sheets

TIME TO FIRST FIX, TTFF, SENSITIVITY AND ACCURACY FOR A GLOBAL NAVIGATION SATELLITE SYSTEM POSITIONING DEVICE

CROSS-REFERENCE TO RELATED APPLICATION

This application is a 35 U.S.C. § 371 National Phase Entry Application from PCT/EP2011/070042, filed Nov. 14, 2011, and designating the United States.

TECHNICAL FIELD

The present invention relates to a method for improving Time To First Fix, TTFF, sensitivity and accuracy. The present invention also relates to a Core Service, a Global Navigation Satellite System, GNSS, positioning device, a Radio Module and a User Equipment, UE, adapted for the same purpose.

BACKGROUND

Two main satellite-based navigation systems are operational today. The USA's Global Positioning System (GPS) and Russia's GLObal NAvigation Satellite System (GLONASS) GPS have been operational since 1978 and globally available since 1994. It consists of up to 32 medium earth orbit satellites in six different orbital planes, with the exact number of satellites varying as older satellites are replaced. GLONASS was a fully functional navigation constellation in 1995. After the collapsed Soviet Union it was recovered in 2011.

New systems like Galileo, COMPASS navigation system and IRNSS (Indian Regional Navigation Satellite System) is under development. IRNSS is an autonomous regional satellite navigation system under control of the Indian government. It will consist of a constellation of 7 satellites and is intended to map the India region. COMPASS is a Chinese system with up to 35 satellites in different orbits. It intends to be expanded to a global navigation system by 2020. Galileo is set up by the European Union and consists of 30 satellites providing global coverage. It will become operational in 2014 and reach full operation in 2020.

It is estimated that nine out of every ten new satellite navigation receivers currently sold are for civilian or commercial use. The current systems are thus widely used by civilians. The penetration rate is high for old Mobile phone, laptop, smart phone, or pad is equipped with a positioning device.

The common name for all these systems is Global Navigation Satellite Systems (GNSS). In these GNSS assistance solutions are needed and presently used to improve performance for Time To First Fix (TTFF), sensitivity and accuracy regarding positioning data. These assistance solutions could be of the following kinds:

Providing the positioning device with information regarding GNSS satellite positions for a given moment in the future, satellite clock off sets, PRN (Pseudo Random Noise) codes for the satellites etc. All together so called ephemeris and calendar data. This information is sent via a wireless network and hence the device must be equipped with a WWAN (Wireless Wide Area Network) or WLAN (Wireless Local Area Network) transceiver to be able to communicate with a mobile network and receive said data.

Providing a rough position by using information given by what base station in the mobile network the device is connected to in the case where the device is equipped with a WWAN transceiver. Hereby, together with ephemeris data provided or stored in memory in the device, the search space for the positioning device is decreased and TTFF, sensitivity and accuracy performance can be improved.

Providing a rough time to the positioning device provided via WWAN. It could be done with a running real time clock in the device or provided from external source. Hereby, together with ephemeris data provided or stored in memory in the device, the search space for the positioning device is decreased and TTFF, sensitivity and accuracy performance can be improved.

If the GNSS equipped device does not have access to assistance solutions, or does not have valid broadcast ephemeris, almanac, position or timing data, the GNSS device must work in a so called autonomous mode. This means that it must search over frequency, time delay and PRN code space to find satellites and being able to compute the position.

GNSS devices are quite often used for navigation purposes. One user case could be that a person with a navigation device equipped UE (laptop, smart phone, pad or any other electronic device) where GNSS is not always on, turns on the navigation device when entering the car. The driver then needs to have a travel description before being able to start driving and choosing directions in the road system. TTFF and accuracy is critical in this case since the navigation device cannot give a travel description before position is known.

If the navigation device is equipped with an assistance solution and a WWAN or WLAN transceiver that is connected to a mobile network it will speed up TTFF. If not, the navigation device must work in the autonomous mode.

Both in assisted mode and in autonomous mode the TTFF could be too long for a positive user experience. Reasons could be weak satellite signal strength due to attenuation from vehicle body or no line of sight in urban canyons or indoor.

SUMMARY

The object of the present invention is to improve the experience of Time To First Fix, TTFF, sensitivity and accuracy for a Global Navigation Satellite System positioning device.

The object of the present invention is obtained by means of a method for improving Time To First Fix, TTFF, sensitivity and accuracy, wherein a Global Navigation Satellite System, GNSS, positioning device, communicates with a Core Service in a User Equipment, the GNSS positioning device acquires GNSS satellite signals and navigation data and based on said signals/data determines a position within TTFF the Core Service detects user data indicating specific user behaviours and initiates said determination of position based on said user data.

The object of the present invention is also obtained by means of a Core Service arranged in a UE for improving Time To First Fix, TTFF, sensitivity and accuracy. The Core Service is arranged to communicate with a Global Navigation Satellite System, GNSS, positioning device. The Core Service is arranged to detect user data indicating specific UE user behaviours and initiate a determination of a position in the GNSS positioning device based on said detected user data.

The object of the present invention also obtained by means of a Global Navigation Satellite System, GNSS, positioning device arranged in a UE for improving Time To First Fix, TTFF, sensitivity and accuracy. The GNSS positioning device is arranged to communicate with a Core Service. The GNSS positioning device is further arranged to acquire GNSS satellite signals and positioning data and based on said signals/data determine a position within TTFF.

The object of the present invention is also obtained by means of a Radio Module comprising the GNSS positioning device and a User Equipment, UE, comprising the Radio Module.

Several advantages are obtained by means of the present invention. The main advantage is that in many user cases the TTFF will be decreased and position accuracy will be improved. This will lead to a more positive user experience of the embedded positioning solution in the UE, leading to that the GNSS device, and if available the WWAN or WLAN transceiver will be used more frequently, with increased advantage for the end user.

BRIEF DESCRIPTION OF THE DRAWINGS

The present invention will now be described more in detail with reference to the appended drawings, where.

DETAILED DESCRIPTION

The embodiments of the invention with further developments described in the following are to be regarded only as examples and are in no way to limit the scope of the protection provided by the patent claims.

The present invention relates to a method for improving Time To First Fix, TTFF, sensitivity and accuracy. The present invention also relates to a Core Service, a Global Navigation Satellite System, GNSS, positioning device, a Radio Module and a User Equipment, UE, adapted for the same purpose. Even though the detailed description mainly describes the method being performed by the different entities, the person skilled in the art realizes that the entities being arranged to perform this method are also disclosed in the description.

Figure 1:
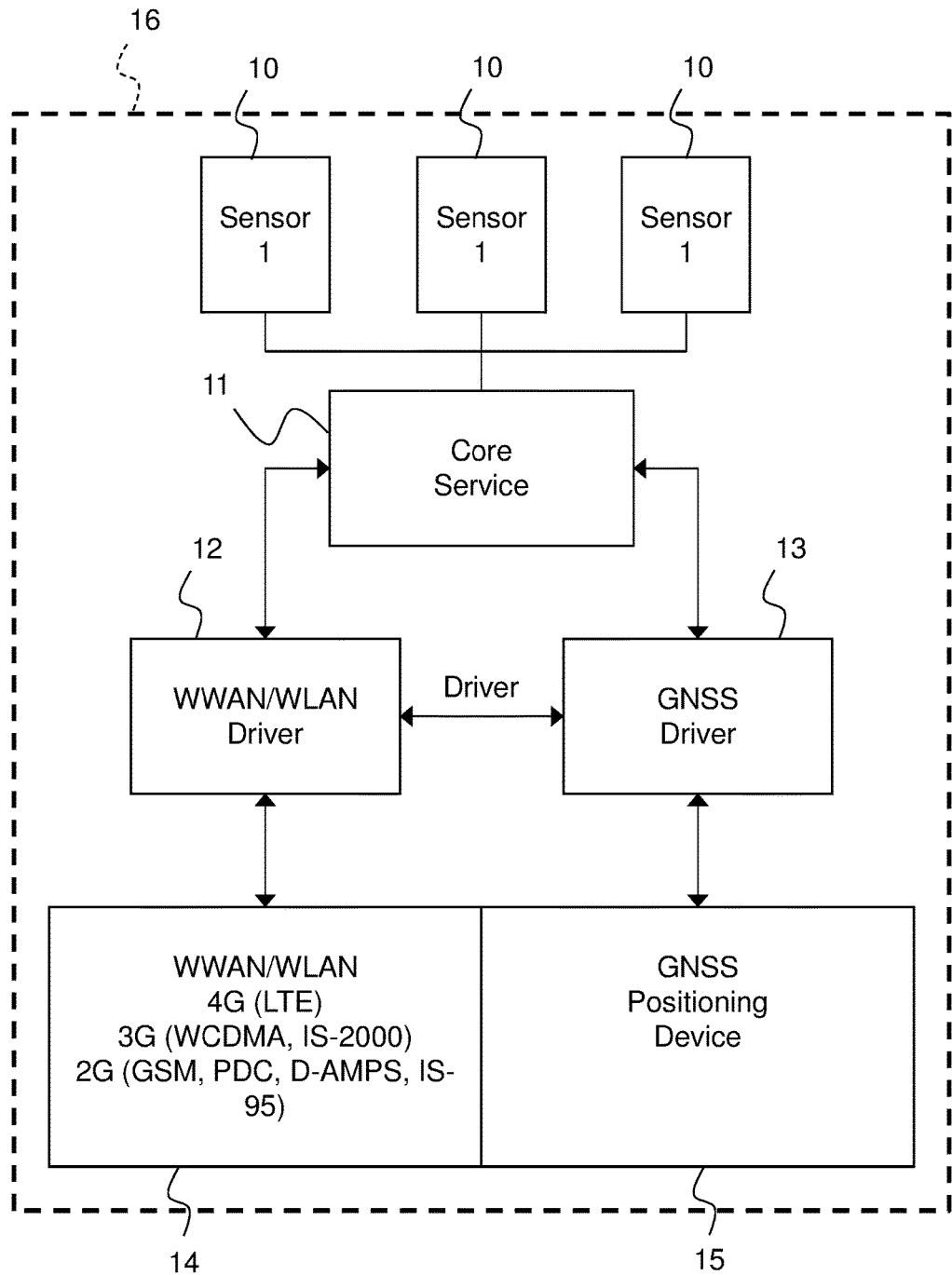
FIG. 1 schematically shows a block diagram of entities in a User Equipment being involved in the present invention.

FIG. 1 schematically shows a block diagram of entities in the User Equipment 16, UE, being involved in the present invention. The UE 16 comprises a Core Service 11 which could also be named host. The Core Service is connected to different sensors 10 which provide data to the Core Service. Such information is for instance user data indicating specific user behaviours of the UE user. These user data will be used in the present invention, as will be described in the following.

The Core Service 11 is further connected to a GNSS Driver 13. If the UE 16 is equipped with means for enabling wireless communication, Wireless Wide Area Network (WWAN) and/or Wireless Local Area Network (WLAN) drivers are also provided in the UE. These drivers communicate with each other in order to enable exchange of data. In the UE, there is also a GNSS positioning device 15.

If the UE is equipped with a Radio Module, this Module comprises the GNSS positioning device 15. The Radio Module may further comprise a Wireless Wide Area Network, WWAN, or Wireless Local Area Network, WLAN, device 14 arranged to enable a connection enabling the GNSS positioning device to access assistance solutions providing information about GNSS satellites used for determining the position. A person skilled in the art would realize that any means for enabling wireless communication with the UE, such as Bluetooth, are part of the present invention.

The Radio Modules can be mounted as discrete components in a socket or soldered onto a Printed Circuit Board, PCB, or as separate PCM or integrated in the host platform of the UE 16. Antennas are connected both to the WWAN/WLAN functionalities of the Radio Module and the GNSS Devices.

Figure 3:
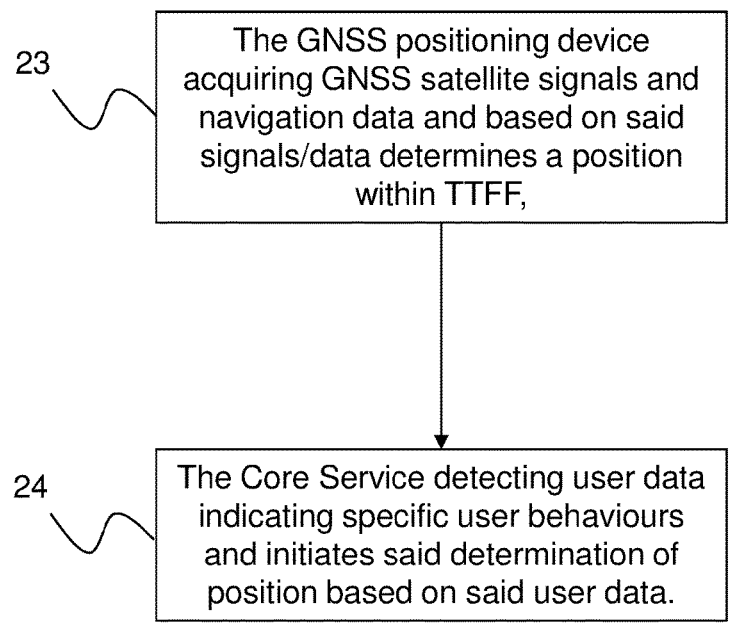
FIG. 3 shows a flow chart of a method according to the present invention.

The method according to the present invention will now be described. The object of the presented method is to improve Time To First Fix, TTFF, sensitivity and accuracy for a Global Navigation Satellite System positioning device. The Global Navigation Satellite System, GNSS, positioning device 15, communicates with the Core Service 11 in the User Equipment, UE 16. The following steps are performed, see FIG. 3:

1. The GNSS positioning device acquires GNSS satellite signals and navigation data and based on said signals/data determines a position within TTFF.
2. The Core Service detects user data indicating specific user behaviours and initiates said determination of position based on said user data.

The basic idea of the invention is to link specific user behaviors to automatic start of the GNSS positioning device 15. When the Core Service (the host Operative System) of the UE (a laptop, smart phone, pad or any other electronic device) detects a specific user behavior, it initiates a position determination by the GNSS positioning device. The GNSS device is inactive before being activated by the Core Service. This has become feasible lately as power consumption of GNSS positioning devices has come down dramatically, thus making this kind of work schemes possible without draining the battery in an intolerable way.

The main advantage is that in many user cases the TTFF will be decreased and position accuracy will be improved. This will lead to a more positive user experience of the embedded positioning solution in the UE, leading to that the GNSS device, and if available the WWAN or WLAN transceiver will be used more frequently, with increased advantage for the end user.

The Core Service 11 sends a start command to the GNSS positioning device 15 to initiate said determination of the position. The user data consists in lid power detection, battery power detection, docking station detection or change in acceleration detection for the UE 16. The data is provided via the sensors 10 illustrated in FIG. 1. Sensors are typically sensors such as an accelerometer, docking detection means, lid detector, power supply detector, and mouse detach detector etc. The sensor may be discrete components in the UE or signals generated in other components of the UE. A person skilled in the art therefore realizes that any means generating said user data are embraced within the present invention.

The Core Service 11 may set up an autonomous mode when initiating said determination of the position. The autonomous mode comprises a search over frequency, time delay and Pseudo Random Noise, PRN, code space to find GNSS satellites used for determining the position.

When the UE is equipped with WWAN or WLAN functionality 14, the Core Service 11 may also initiate a set-up of a Wireless Wide Area Network, WWAN, or Wireless Local Area Network, WLAN, connection when initiating said determination of the position. This connection enables the GNSS positioning device to access assistance solutions providing information about at least used for determining the position. The user data may then consist in a change in low pass filtered Received Signal Strength Indication, RSSI, or change of radio cell identity for the WWAN or WLAN connection.

These GNSS assistance solutions information is needed to improve performance for Time To First Fix (TTFF), sensitivity and accuracy regarding positioning data. This assistance solutions information could be of the following kinds:

Providing the positioning device with information regarding GNSS satellite positions for a given moment in the future, satellite clock off sets, PRN (Pseudo Random Noise) codes for the satellites etc. All together so called ephemeris and calendar data. This information is sent via a wireless network and hence the device must be equipped with a WWAN (Wireless Wide Area Network) or WLAN (Wireless Local Area Network) transceiver to be able to communicate with a mobile network and receive said data.

Providing a rough position by using information given by what base station in the mobile network the device is connected to in the case where the device is equipped with a WWAN transceiver. Hereby, together with ephemeris data provided or stored in memory in the device, the search space for the positioning device is decreased and TTFF, sensitivity and accuracy performance can be improved.

Providing a rough time to the positioning device provided via WWAN. It could be done with a running real time clock in the device or provided from external source. Hereby, together with ephemeris data provided or stored in memory in the device, the search space for the positioning device is decreased and TTFF, sensitivity and accuracy performance can be improved.

Figure 2:
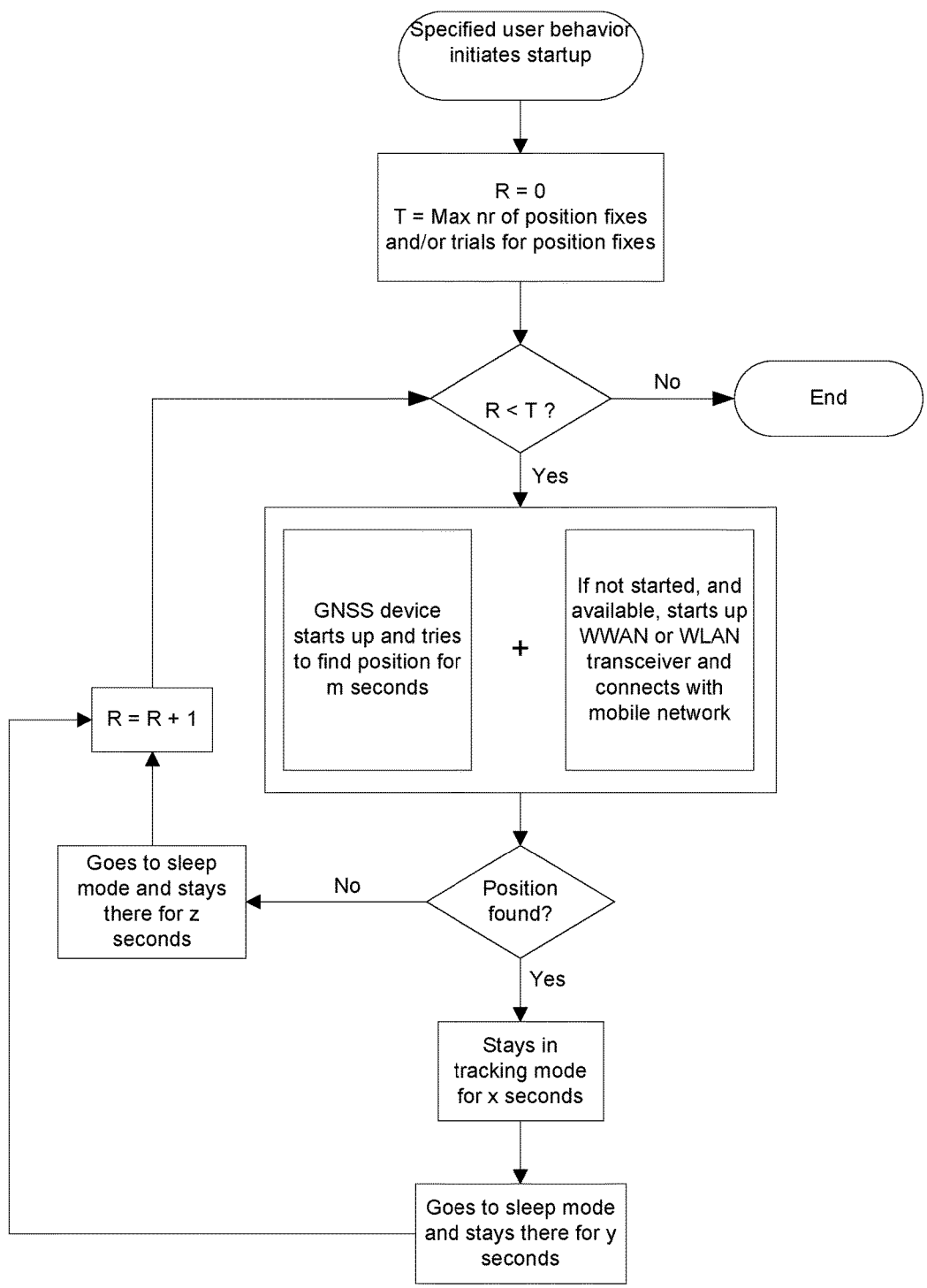
FIG. 2 shows a flowchart of a positioning search scheme according to the present invention.

FIG. 2 shows a flowchart of a positioning search scheme according to the present invention. When a user behavior occurs, the GNSS positioning device 15, and if available the WWAN or WLAN transceiver, automatically starts up and starts to search for the position of the GNSS device. In this process new assistance data will be downloaded (if a wireless access is available) if needed at the same time the GNSS is starting to search for satellites. Data such as fetch cell id, course time assistance and coarse position is downloaded. If no position is found within a certain time frame, the search mode will end for a period of time. After some time has elapsed the GNSS device, and if available the WWAN or WLAN transceiver, will automatically resume the search for position. These work schemes can continue for a suitable number of times.

All time frames that could be specified are totally free of choice. In this way the GNSS positioning device can possibly search for a position when the conditions are favorable, for example when the user is walking outside, under a clear sky with good access to GNSS satellite signals. Then, when the user needs to know his position, for example when a travel description is requested, the TTFF will be extremely quick, in the range of a few seconds. Since the last known position and fresh ephemeris data will be stored in the non volatile memory of the GNSS device, the search space in frequency, time delay and PRN code will be very limited, thus making the quick TTFF possible.

The present invention is not limited to the examples above, but may vary freely within the scope of the claims.

Furthermore, some components may be omitted and some, thus not shown components, may be added.

The invention claimed is:

1. A method for improving Time To First Fix (TTFF), wherein a Global Navigation Satellite System (GNSS) positioning device communicates with a Core Service in a User Equipment (UE), the method comprising:
   the Core Service detecting an event; and
   in response to detecting the event, the Core Service initiating a determination of the position of the UE by the GNSS positioning device, wherein
   the event is one of:
   a) lid power detection,
   b) battery power detection,
   c) docking station detection, and
   d) a change in signal strength.

2. The method according claim 1, wherein the Core Service sends a start command to the GNSS positioning device to initiate said determination of the position.

3. The method according to claim 1, wherein the Core Service also initiates a set-up of a Wireless Wide Area Network (WWAN) or Wireless Local Area Network (WLAN) connection when initiating said determination of the position, the connection enabling the GNSS positioning device to access assistance solutions providing information at least used for determining the position.

4. The method according to claim 1, wherein the Core Service sets up an autonomous mode when initiating said determination of the position, said autonomous mode comprising a search over frequency, time delay and Pseudo Random Noise, (PRN) code space to find GNSS satellites used for determining the position.

5. A user equipment (UE), the UE comprising:
   a sensor;
   a Global Navigation Satellite System (GNSS) positioning device; and
   a core service coupled to the sensor and the GNSS, wherein
   the core service is configured to: 1) detect an event based on data from the sensor and 2) as a result of detecting the event, activate the GNSS positioning device to initiate a determination of the position of the UE by the GNSS positioning device,
   the GNSS positioning device is configured such that, as a result of the core service activating the GNSS positioning device, the GNSS positioning device acquires GNSS satellite signals and uses said GNSS satellite signals to determine the position of the UE, and
   the event is one of: a) lid power detection, b) battery power detection, c) docking station detection, and d) a change in signal strength.

6. The UE of claim 5, wherein the core service is further configured to: 1) detect at least a certain change in the UE's acceleration and 2) as a result of detecting the at least certain change in the UE's acceleration, activate the GNSS positioning device to initiate a determination of the position of the UE by the GNSS positioning device.

7. The UE of claim 5, wherein the core service is arranged to initiate a set-up of a connection when activating the GNSS positioning device, the connection enabling the GNSS positioning device to access assistance solutions providing information at least used for determining the position.

8. The UE of claim 7, further comprising a radio module, wherein the core service is configured to initiate the set-up of the connection by communicating with the radio module.

9. The UE of claim 5, wherein the core service is arranged to set up an autonomous mode when activating the GNSS positioning device, said autonomous mode comprising a search over frequency, time delay and Pseudo Random Noise (PRN) code space to find GNSS satellites used for determining the position.

10. The method of claim 1, further comprising:
detecting an amount of acceleration experienced by the UE;
determining whether the detected amount of acceleration exceeds a threshold, and
as a result of determining that the detected amount of acceleration exceeds a threshold, activating the GNSS positioning device to initiate a determination of the position of the UE by the GNSS positioning device.

* * * * *